United States Patent [19]

Olde Heuvel

[11] Patent Number: 5,492,026

[45] Date of Patent: Feb. 20, 1996

[54] CONTINUOUSLY ADJUSTABLE TRANSMISSION

[76] Inventor: Bernardus J. M. Olde Heuvel, Ganzebree 11, NL-7482 LD Haaksbergen, Netherlands

[21] Appl. No.: 146,112

[22] PCT Filed: May 8, 1992

[86] PCT No.: PCT/NL92/00084

§ 371 Date: Jan. 13, 1994

§ 102(e) Date: Jan. 13, 1994

[87] PCT Pub. No.: WO92/20566

PCT Pub. Date: Nov. 26, 1992

[30] Foreign Application Priority Data

May 10, 1991 [NL] Netherlands ............................ 9100813

[51] Int. Cl.$^6$ .............................. F16H 29/16; B62M 9/08
[52] U.S. Cl. ................................................ 74/117; 475/170
[58] Field of Search ...................................... 475/169, 170, 475/183; 74/116, 117

[56] References Cited

U.S. PATENT DOCUMENTS

| | | | |
|---|---|---|---|
| 1,945,702 | 2/1934 | Pitter | 74/117 |
| 2,677,968 | 4/1951 | Hubner | 74/112 |
| 3,892,139 | 7/1975 | Harris | 74/117 X |
| 5,029,486 | 7/1991 | Mercat | 74/117 |
| 5,048,358 | 9/1991 | Shook | 74/117 X |

FOREIGN PATENT DOCUMENTS

| | | |
|---|---|---|
| 32888 | 7/1981 | European Pat. Off. . |
| 208473 | 1/1987 | European Pat. Off. . |
| 362016 | 4/1990 | European Pat. Off. . |
| 375389 | 7/1907 | France . |
| 108472 | 11/1954 | France . |
| 8900501 | 10/1990 | Netherlands . |
| 9100813 | 5/1992 | Netherlands . |
| 476362 | 12/1937 | United Kingdom . |
| 2035478 | 6/1980 | United Kingdom ................... 475/170 |

*Primary Examiner*—Khoi Q. Ta
*Attorney, Agent, or Firm*—Young & Thompson

[57] ABSTRACT

A continuously adjustable transmission comprises a number of arms (18), one end of each of which is pivotably connected to a rotatably arranged driven first member (17) and of which the other end cooperates with a second rotatably arranged member (15). The axes of rotation (20) of the arms (18) are parallel to the axes of rotation of the members (15, 17) and are evenly distributed about a circle. The part of the second member (15) acted upon by the arms lies at a radial distance from the circle in which the axes of rotation (20) of the arms (18) are situated. Both members (15, 17) are movable in relation to each other between a concentric position in which the transmission ratio is 1:1 and an eccentric position for obtaining another transmission ratio. The arms (18) are situated in a common radial plane and the end of each arm which cooperates with the second member (15) has an elongated clamping member (19) pivotably connected with the arm (18) through an axially extending shaft (21). Each clamping member (19) is accommodated in a ring-shaped slot (22) in the second member (15). A spring (24) acts between each arm and the corresponding clamping member (19) in a direction such that opposite ends of the clamping member (19) will be urged to engage two opposite, substantially cylindrical walls (23) of the slot (22). The distance between the points where one clamping member (19) engages the opposite walls (23) is greater than the radial distance between the walls (23).

4 Claims, 3 Drawing Sheets

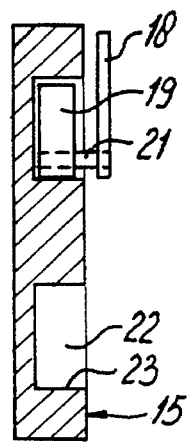
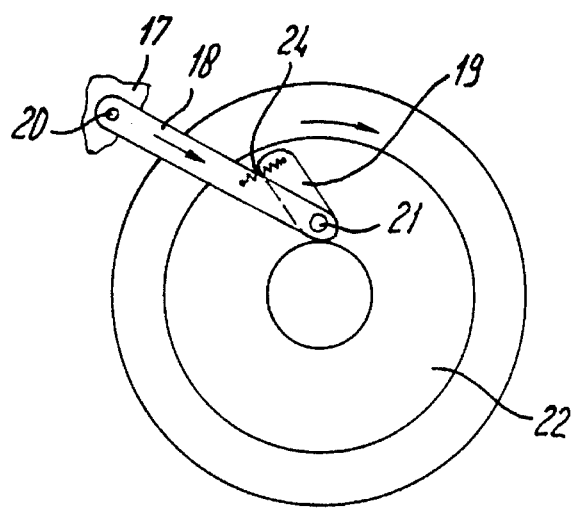
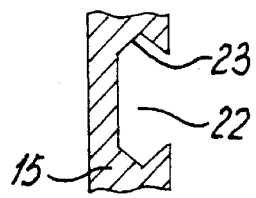
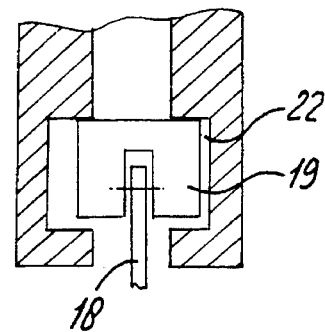
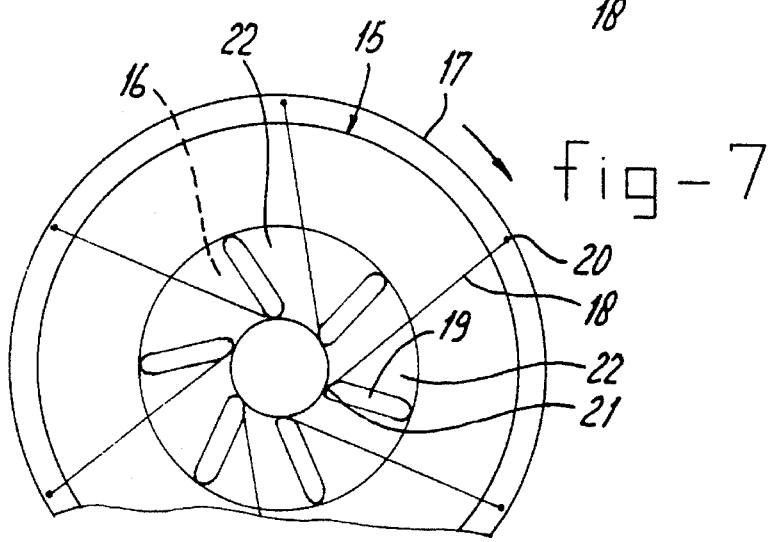

CONTINUOUSLY ADJUSTABLE TRANSMISSION

The invention relates to a continuously adjustable transmission, which comprises a number of arms, one end of which is pivotably connected to a rotatably arranged first member to be driven from the outside or by the transmission itself, and of which the other end acts on a second rotatably arranged member, the axes of rotation of the arms being parallel to the axes of rotation of the members and being evenly distributed about a circle, in which the part of the second member being acted upon by the arms lies at a radial distance from the circle on which the axes of rotation of the arms are situated, both members having been arranged such that they are movable in relation to each other between a concentric position in which the transmission ratio is 1:1 and an eccentric position for obtaining another transmission ratio.

Such a transmission is known from NL-A-8900501. In this known device, the arms are also pivotably connected to the second member and executed telescopically for being able to accommodate the differences in length occurring in the eccentric position of both members. Only when they have their minimal lengths, they will be active for transmission of forces. Further, each arm with its related parts is situated in a separate plane, so that the transmission takes up a lot of space and comprises many parts.

The invention intends to remove these disadvantages and to that end provides that a number of arms are situated in a same radial plane and that each of the arm-ends acting on the second member has at the end concerned been provided with an elongated clamping member rotatably connected with the arm through an axially extending shaft, which clamping member has been accommodated in a ring-shaped slot made in the second member, with parts of the clamping member engaging the two opposite, substantially cylindrical walls of the slot by means of spring force, while the center of rotation between a clamping member and the corresponding arm is positioned such and the clamping member is formed such, that under certain conditions, the clamping member establishes a fixed connection between the arm and the second member, as a result of clamping.

The spring force exerted on a clamping member need only be sufficient for keeping the parts concerned of the clamping member in contact with the walls of the slot and therefore can be small. When the clamping member is not active, it will easily slide along the walls of the slot, which only produce a small frictional resistance.

For a most suitable distribution of forces exerted on the various parts it can be provided that the clamping member extends at both sides of the corresponding arm and that each of the parts present at both sides of the arm is situated in a slot of the second member.

Through this it is achieved, that the arm is only under tension or pressure and that only a radially directed force is exerted on the clamping member.

In order to obtain a still better clamping of a clamping member in the slot of the second member, it can be provided that at least one of the walls of the slot, seen in cross section, has a V-shape such that the clamping member is accommodated in the V-shaped part.

According to a development of the invention, the spring force by which the clamping member engages the walls of the slot, can be created by means of a tension or compression spring situated between the clamping member and the corresponding arm.

Owing to the fact, that the arm and the clamping member at a transmission ratio other than 1:1 will take up a continually varying position in relation to each other, the spring force will likewise change continuously.

When this would cause difficulties, it can be provided that the clamping member consists of two sections, with the one section near one end being pivotally connected to the arm and near the other end to the other section, in which the pivoting point between the sections is situated between the walls of the slot and a spring is present between the sections for pressing each of the sections against the corresponding wall of the slot, while the end of the arm connected with one section is guided by a part of the second member, which is concentric to the slot present in this member.

It can also be provided that the spring force is supplied by a member arranged such, that only in a certain position of the clamping member in relation to an arm or arms, a spring force is exerted on the clamping member.

This can be achieved for example by applying a compression spring, which will deflect on exceeding a certain force and therefore will hardly produce any force.

The invention is further explained by way of embodiments, illustrated in the drawings in which.

Figure 1:
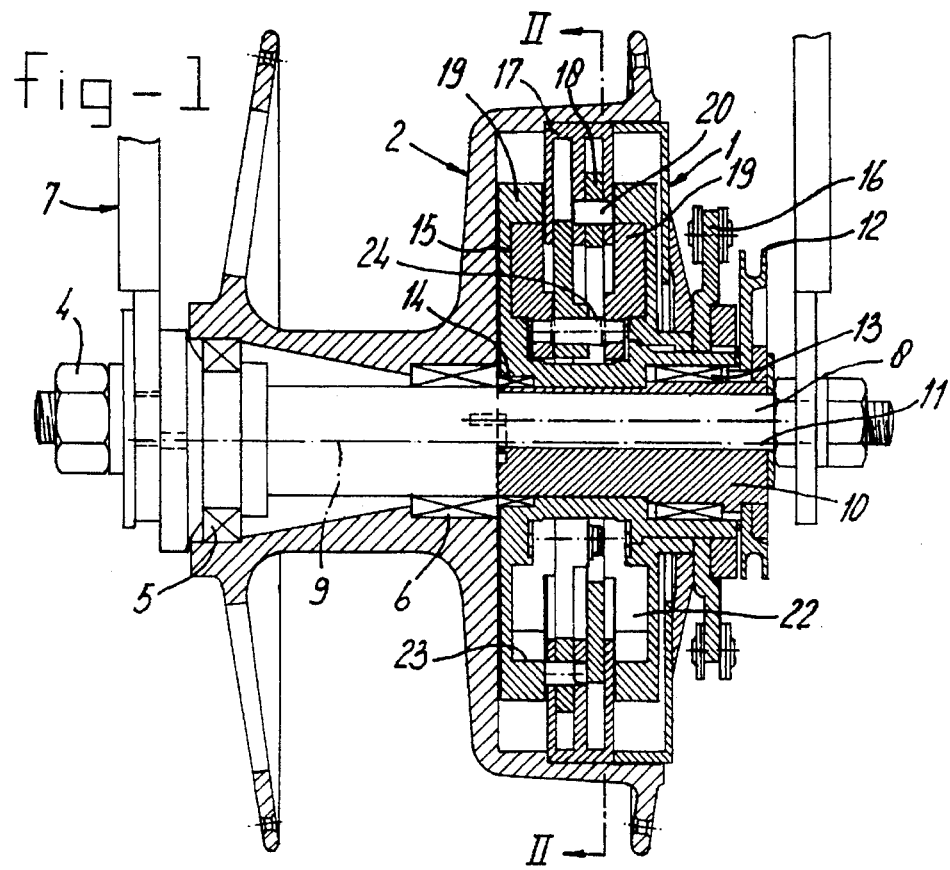
FIG. 1 shows a section across the axis of a device according to the invention, applied in a bicycle wheel.
Figure 2:
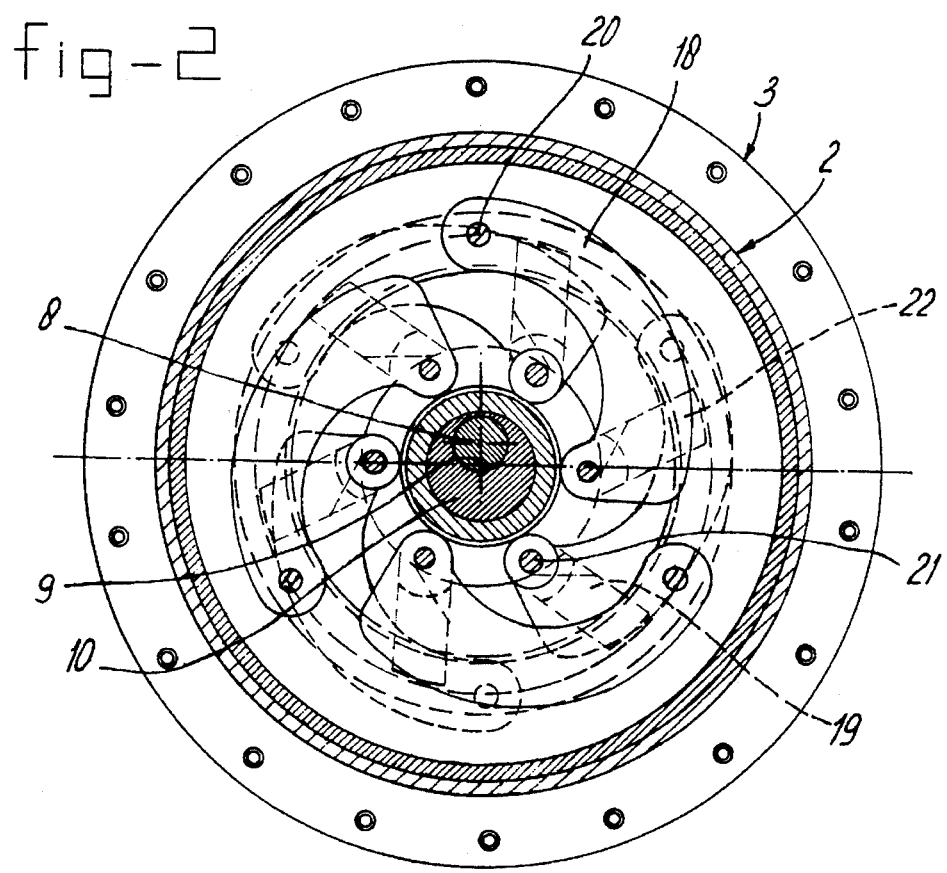
FIG. 2 shows a section according to line II—II of FIG. 1.
Figure 8:
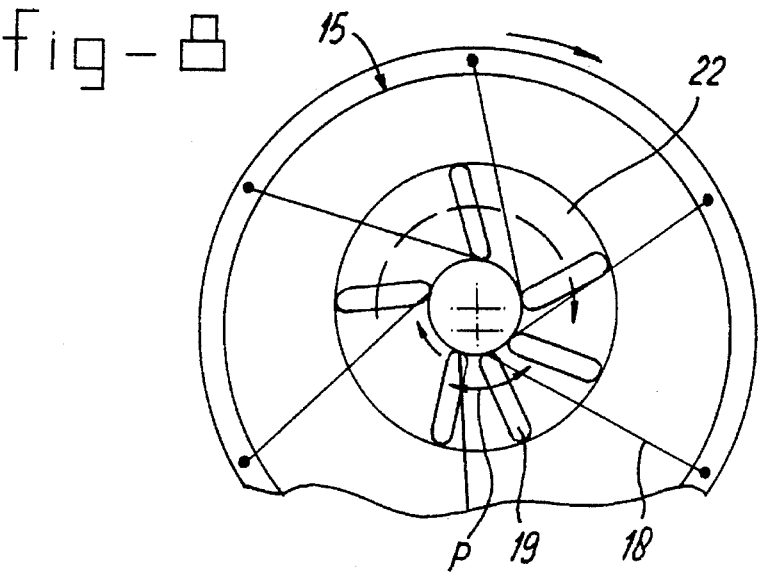
Figure 9:
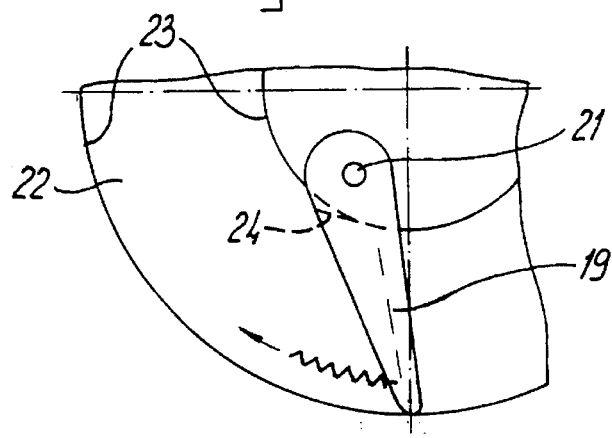
Figure 10:
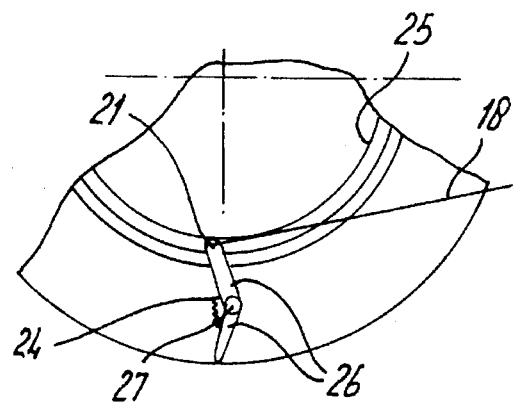

FIG. 3 diagrammatically shows a section across a part of the device of the FIGS. 1 and 2;

FIG. 4 shows a side view of the parts of FIG. 3;

FIG. 5 shows a section across the slot of an alternative shape;

FIG. 6 shows a section across a clamping member extending at both sides of the arm and accommodated in two slots;

FIG. 7 diagrammatically shows a view of a slot with a number of clamping members and the corresponding arms in the position in which the transmission ratio is 1:1;

FIG. 8 shows a view corresponding to FIG. 7, yet in the position in which the transmission ratio has been changed; and FIGS. 9 and 10 diagrammatically show views corresponding to FIG. 4, yet of other embodiments of the clamping member.

FIGS. 1 and 2 show a continuously adjustable transmission 1 mounted in the hub 2 of a bicycle wheel 3, the other parts of which, namely the spokes and with the rim, have been omitted.

The wheel 3 is rotatably mounted on the shaft 4 by means of the bearings 5 and 6 and the shaft 4 is fixed in the fork 7 by nuts with washers not further indicated.

Beside the bearing 6, the shaft 4 is provided with a portion 8, which is eccentric to the axis 9 of the shaft 4. A bushing 10 is rotatably mounted on the portion 8 by means of an eccentric bore 11. The bush 10 is rotatable by means of the part 12 fixedly connected thereto, around which e.g. a cable not further described can extend for adjusting the position of the bushing 10 in respect of the axis 9. On the bushing 10, the bearings 13 and 14 are situated for rotatably supporting the part 15. The part 15 can be driven by means of the sprocket wheel 16. By rotation of the bushing 10, the axis of the bearings 13 and 14 can coincide with the axis 9 of the shaft 4, or be at some distance therefrom, as appears in particular from FIG. 2.

The part 17 is connected to the hub 2 and the arms 18 and the clamping members 19 are situated between the parts 15 and 17. The arms 18 are pivotably connected to the part 17 by means of the pins 20, and a clamping member 19 is connected to each arm 18 by means of a pin 21. The clamping members 19 are situated in slots 22 in the part 15. The cylindrical walls of the slots are indicated by 23.

For a better understanding of the invention, FIGS. 3 and 4 diagrammatically show an arm 18, which is rotatably connected with the part 15 by the pin 20 and by the pin 21 to the clamping member 19. The clamping member 19 is in the slot 22 of the part 17, such that it will clamp itself against the walls 23 of the slot 22 upon a certain movement of the arm 18. Between the arm 18 and the clamping member 19 is a spring 24 for keeping the clamping member in engagement with the walls 23 also when it is not clamped tightly in the slot 22.

FIG. 5 shows the possibility that both walls 23 of the slot 22 are not formed cylindrically, but in V-shape. It is also possible, that only one of the walls is formed as such, depending on the shape of the clamping member 19.

FIG. 6 shows a clamping member 19 formed as an entity mounted to one arm 18 and cooperating with two slots 22.

FIGS. 7 and 8 diagrammatically show the operation of the transmission according to the invention. In FIG. 7, the axis of rotation of the part 15, driven by the sprocket wheel 16 for example, is in line with that of the wheel hub 2, so that an entirely rotation-symmetrical arrangement of the arms 18 and the clamping members 19 is obtained. All clamping members can then be operative for transmitting the rotational force from the sprocket wheel 16 to the wheel hub 2. In FIG. 8, the axes of rotation are displaced in relation to each other by rotation of the bushing 10. Due to this, only one of the arms 18 will effect the clamping of the clamping member 19 connected therewith to the slot 22, and the slot 22 will thereby be moved over a different distance than in the case of FIG. 7 and thus will get a different peripheral velocity. The speed of the part 15 provided with the slot 22 will therefore be different from that of the part 17. The other clamping members 18 will slide along the walls 23 of the slot 22 and not be able to clamp themselves therein.

The arrow P roughly indicates the area in which a certain clamping member is operative. As it appears, here the clamping members 19 together and in relation to the corresponding arms 18 take up a different position than is the case with the arms lying further away. This situation can be used to ensure, that the non-operative clamping members are not or are hardly pressed against the walls of the slot. As mentioned above, one can employ a compression spring for example, which deflects on exceeding a certain force.

FIG. 9 shows another specific embodiment of a clamping member 19. It has on the one hand a collar 24 with one straight shoulder, that can lie against the one wall 23 of the slot 22, while the other end of the clamping member 19 is rounded off in order to lie against the other wall 23. The spring 24 is again mounted between the illustrated arm and the clamping member 19.

FIG. 10 shows the possibility of guiding the end of the arm 18 connected to the clamping member 19 into a slot 25, for example by means of the pivot pin 21. The clamping member 19 now comprises two sections 26, pivotally connected to each other by the pin 27 and loaded by the spring 24 in such a way, that they will be in line as much as possible.

In the figures, it is illustrated that all arms 18 are in one single plane. Owing to this, the number of arms that can be used with a certain diameter of the parts will be limited. When one arm becomes inoperative and the next arm becomes operative, a certain changing of load will occur. In most cases, this will not cause any difficulties and be hardly noticeable. However, when said changing of load is undesired, there is the possibility of mounting a number of arms in two planes lying adjacent each other, such that the arms of the one system are situated between the arms of the other system, by which the transmission of force becomes more even.

It will be obvious, that only some possible embodiments have been illustrated in the drawing and described above and that many changes can be made without departing from the scope of the appended claims.

I claim:

1. In a continuously adjustable transmission, which comprises a number of arms (18), one end of each of which is pivotably connected to a rotatably arranged driven first member (17) and of which the other end is operatively connected to a second rotatably arranged member (15), the axes of rotation (20) of the arms (18) being parallel to the axes of rotation of the members (15, 17) and being evenly distributed about a circle, in which the part of the second member (15) acted upon by the arms lies at a radial distance from the circle in which the axes of rotation (20) of the arms (18) are situated, both members (15, 17) being movable in relation to each other between a concentric position in which the transmission ratio is 1:1 and an eccentric position for obtaining another transmission ratio; the improvement wherein said arms (18) are situated in a common radial plane and the end of each arm which is operatively connected to the second member (15) having an elongated clamping member (19) pivotably connected with the arm (18) through an axially extending shaft (21), said clamping member (19) being accommodated in a ring-shaped slot (22) in the second member (15), and spring means (24) acting between each arm and the corresponding said clamping member (19) in a direction such that opposite ends of the clamping member (19) will engage two opposite, substantially cylindrical walls (23) of the slot (22).

2. Transmission according to claim 1, wherein the clamping member (19) extends on both axial sides of the corresponding arm (18) and each of the parts present on both axial sides of the arm is situated in a slot (22) of the second member (15).

3. Transmission according to claim 1, wherein at least one of the walls (23) of the slot (22), seen in cross section, has a V-shape such that the clamping member (19) is accommodated in the V-shaped part.

4. Transmission according to claim 1, wherein the clamping member (19) consists of two sections (26), with the one section near one end being pivotally (21) connected to the arm (18) and near the other end to the other section, and wherein the pivoting point (27) between the sections (26) is situated between the walls (23) of the slot (22) and said spring means (24) is present between the sections (26) for making each of the sections engage the corresponding wall (23) of the slot (22), while the end of the arm (18) connected with one section is guided by a part of the second member (15), which is concentric to the slot (22) present in this member.

* * * * *